United States Patent [19]

Akbar et al.

[11] Patent Number: 5,222,745
[45] Date of Patent: Jun. 29, 1993

[54] RTV-LESS GASKET ASSEMBLY

[75] Inventors: Nemat Akbar, Weatherford; Harold Wright, Keene, both of Tex.

[73] Assignee: JMK International, Inc., Fort Worth, Tex.

[21] Appl. No.: 843,633

[22] Filed: Feb. 28, 1992

[51] Int. Cl.$^5$ ............................................. F16J 15/10
[52] U.S. Cl. .............................. 277/207 R; 277/213; 277/215; 277/199; 123/198 E
[58] Field of Search .............. 277/208, 211, 213, 209, 277/215, 235 B, 199, 207 R; 123/198 E

[56] References Cited

U.S. PATENT DOCUMENTS

| | | | |
|---|---|---|---|
| 1,050,132 | 1/1913 | Haynes | 277/213 |
| 2,307,440 | 1/1943 | Wilson | 277/211 |
| 2,968,505 | 1/1961 | Scaramucci | . |
| 4,139,223 | 2/1979 | Clements | 285/99 |
| 4,195,850 | 4/1980 | Berger et al. | 277/12 |
| 4,262,168 | 4/1981 | Bossard | 174/77 |
| 4,398,731 | 8/1983 | Gorman et al. | 277/124 |
| 4,572,522 | 2/1986 | Smagatz | 277/199 |
| 4,597,583 | 7/1986 | Inciong et al. | 277/166 X |
| 4,762,441 | 8/1988 | Glang | 405/152 |
| 4,817,967 | 4/1989 | Belter | 277/199 |
| 4,824,289 | 4/1989 | Glang et al. | 405/152 |
| 4,846,482 | 7/1989 | Blodgett et al. | 277/235 B |
| 4,854,382 | 8/1989 | Funke | 165/167 |
| 4,930,792 | 6/1990 | Gluck et al. | 277/235 |
| 4,942,907 | 7/1990 | Joh et al. | 277/DIG. 9 |
| 4,986,168 | 1/1991 | Geffroy et al. | 92/194 |

FOREIGN PATENT DOCUMENTS

| | | | |
|---|---|---|---|
| 0802832 | 9/1936 | France | 277/211 |
| 0150255 | 9/1920 | United Kingdom | 277/211 |
| 0732576 | 6/1955 | United Kingdom | 277/235 B |
| 0969700 | 9/1964 | United Kingdom | 277/211 |

Primary Examiner—William A. Cuchlinski, Jr.
Assistant Examiner—James K. Folker
Attorney, Agent, or Firm—Keck, Mahin & Cate

[57] ABSTRACT

A gasket assembly and method of making same from at least two gasket structures provides a sufficiently leak-proof seal without the use of a fluid sealing or caulking medium. The first gasket has a contact area on a major surface which includes an array of peaks and valleys which is periodic in two dimensions. The second gasket has an end surface with a contact area which includes an array of valleys and peaks which is periodic in two dimensions. When the peaks and valleys on the contact area of the major surface of the first gasket are engaged with the valleys and peaks on the end surface of the second gasket, the peaks and valleys allow for shift along the x-axis, y-axis and z-axis, accommodating any misalignment of the gaskets within a predetermined stack-up error and thereby providing proper engagement to yield a substantially leak-proof seal.

23 Claims, 3 Drawing Sheets

RTV-LESS GASKET ASSEMBLY

TECHNICAL FIELD OF THE INVENTION

The present invention relates to gasket sealing mechanisms and, in particular, to an improved structure for providing, without the use of a sealing or caulking medium, a relatively leak-proof seal at the junction between two gaskets.

BACKGROUND OF THE INVENTION

Gaskets are used to provide a relatively leak-proof seal between two matched machine parts or other devices. Typically, the two parts include respective flat surfaces which are disposed adjacent to one another during use. A gasket is interposed between the matched surfaces of the two components and compressed between them to prevent the escape of a gas or fluid. Many different structures are known in the art for gaskets of this type.

A particular problem arises at gasket intersections that are disposed at an angle relative to one another, such as is formed with a front cover and oil pan or rocker cover and oil pan, and other T-joints. Prior art attempts at securing a leak-proof seal have either required the use of a sealant or caulking medium, such as one-part room temperature vulcanization (RTV) sealant, or have used key and hole arrangements having flat surfaces.

Each of these solutions has presented problems. A sealing or caulking medium is costly, messy, difficult to service, is a source of manufacturing error and adversely affects the rest of the seal by overfilling the adjacent trench in which the gasket sits. Key and hole arrangements having flat surfaces are prone to failure because of the small amount of relative shift allowed in the mating components. Key and hole arrangements, which include flat surfaces, do not properly engage under certain lateral tolerance stack-up conditions, resulting in less than desirable interlocking and an insufficient seal. Further, key and hole arrangements to date have been linear or one-dimensional and have not provided an RTV-less seal across two dimensions.

In view of the prior art attempts, a long felt need continues to exist for a gasket assembly which provides a sufficiently leak-proof seal at gasket intersections without the use of sealant or caulking medium.

SUMMARY OF THE INVENTION

According to the invention, a sealing structure is provided, which yields a sufficiently leak-proof seal in a gasket assembly without the use of a sealing or caulking medium. The sealing assembly includes at least two gaskets.

The first gasket has a major surface having a contact area which has a two-dimensional periodic array including peaks. A second gasket has an end surface, which is substantially smaller in area than the major surface of the first gasket, with a contact area having a two-dimensional periodic array including valleys. The peaks and valleys may be described respectively as geometric solids and voids, respectively, that preferably consist strictly of planar surfaces having no flat surfaces. The two periodic arrays are mated to provide a substantially leak-proof seal.

In a preferred embodiment of the invention, the first and second gaskets may have alternating peaks and valleys, adapted so the peaks and valleys of the first gasket sealingly engage with the second gasket.

The peaks and valleys can be any geometric shape having planar faces, such as pyramids having 3, 4 or 6 sides. The peaks and valleys provided in the present invention allow for shift along the x-axis and y-axis where these axes are contained within the general plane of the major gasket surface, thereby accommodating any misalignment problems. Further, the peaks and valleys are sufficiently tall and deep in a z-direction that a predetermined vertical stack-up error for the assembly is tolerated.

The present invention confers a principal technical advantage over the prior art in that it yields an effective and economically desirable sealing assembly that does not require the use of a sealing or caulking medium.

BRIEF DESCRIPTION OF THE DRAWINGS

Further aspects of the invention and their advantages may be discerned from reading the following detailed description when taken in conjunction with the drawings, in which.

DETAILED DESCRIPTION OF THE INVENTION

Preferred embodiments of the present invention are best understood by referring to FIGS. 1 through 7 of the drawings, like numerals being used for like and corresponding parts of the various drawings.

Figure 1:
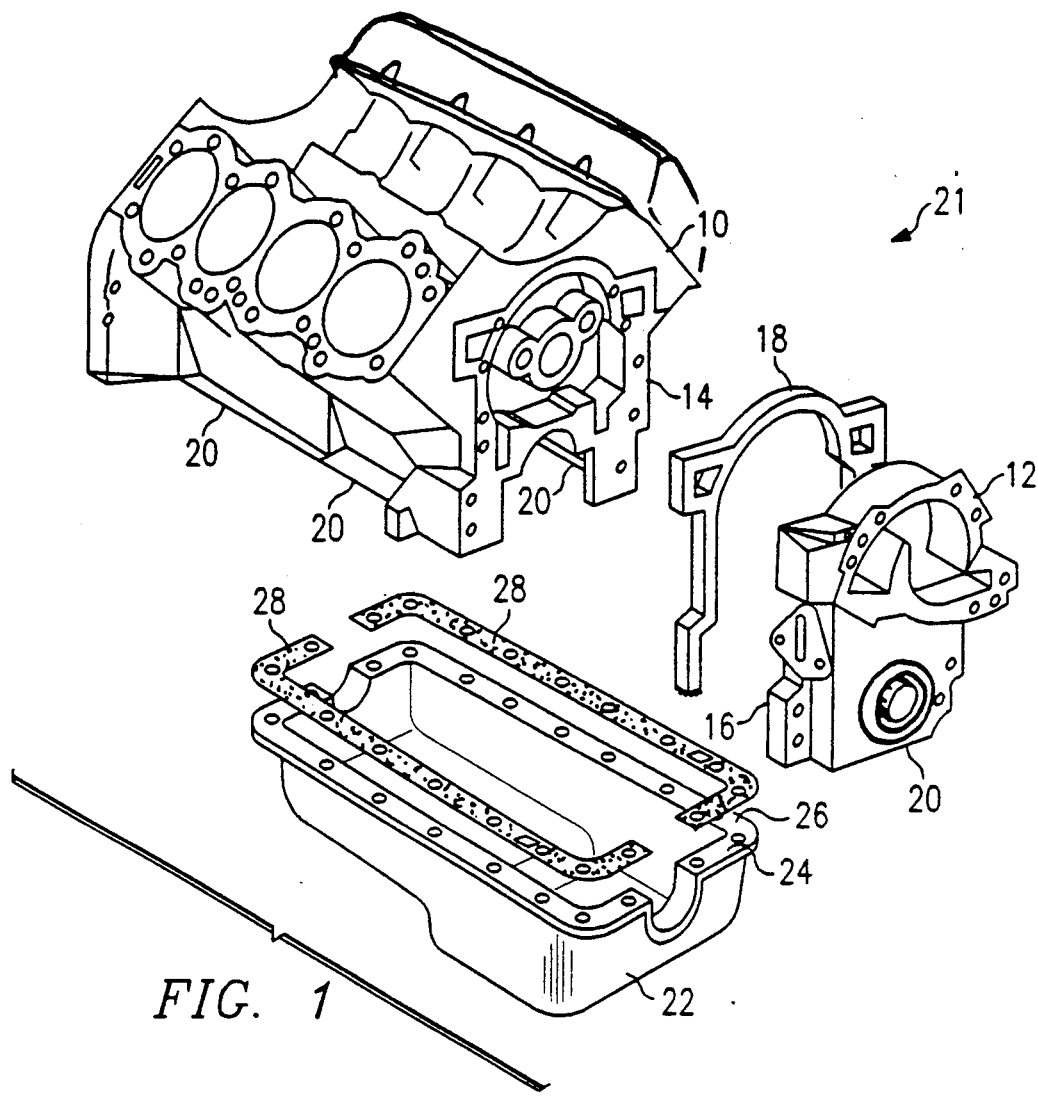
FIG. 1 is an exploded isometric view of a portion of a vehicle engine including abutting front cover and oil pan gaskets.

FIG. 1 is an isometric view of a portion of a conventional vehicle engine. Although the present invention will be described in the context of a vehicle engine, it will be appreciated that other gasket applications are contemplated to be within the scope of the invention. An engine block 10 and a front cover 12 are provided which are adapted to be secured together by any conventional means such as bolts. Vertically extending mating surfaces 14 and 16 are respectively formed on the engine block 10 and the front cover 12 for this purpose. In the illustrated embodiment, mating surface 16 is actually contained within a groove, as will be later described. A first front cover gasket 18 is interposed between the engine block 10 and the front cover 12. When the engine block 10 and the front cover 12 are secured together, the first gasket 18 is compressed between the mating surfaces 14 and 16 to form a relatively leak-proof seal, in a manner which is well known in the art. The engine block 10 and the front cover 12 represent two pieces of the vehicle engine which, when secured together, form a first subassembly 21 thereof. A generally flat horizontally extending mating surface 20 is defined along the bottom of the first subassembly 21 when the engine block 10 and the front cover 12 are secured together.

An oil pan 22 forms a second subassembly of the vehicle engine. The oil pan 22 includes an upper lip portion 24 extending about the periphery of pan 22. A generally flat horizontally extending mating surface 26 is defined along the upper surface of the lip portion 24 which corresponds to the horizontally extending mating surface 20 defined along the bottom of the first subassembly 21. After the engine block 10 and the front cover 12 have been secured together to form the first subassembly 21 as described above, the oil pan 22 can be secured to subassembly 21 by any conventional means such as bolts. A second gasket 28 (illustrated to be in two sections in this embodiment) is horizontally interposed between the mating horizontally extending surfaces 20 and 26 of the first and second subassemblies 21 and 22 and engaged to form a relatively leak-proof seal, in a manner which will be hereinafter described.

Figure 2:
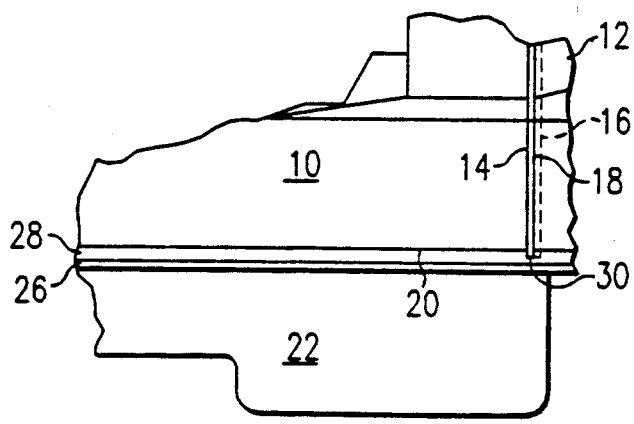
FIG. 2 is an elevational view of a portion of an engine block, front cover and oil pan as assembled with gaskets according to the invention.

FIG. 2 is a fragmentary elevational view of the vehicle engine after the engine block 10, the front cover 12 and the oil pan 22 have been assembled together with gaskets 18 and 28. Front cover gasket 18 is positioned between mating vertical surfaces 14 and 16. Oil pan gasket 28 is positioned between horizontal mating surfaces 20 and 26. An intersection or place of abutment 30 between the front cover gasket 18 and the oil pan gasket 28 has conventionally been sealed with one-part RTV sealant or other fluid caulking compounds because of the conventionally poor sealing properties of this intersection or abutment. A principal advantage of the invention is that, as using the periodically repeating abutting surfaces of the invention, an abutment can be formed that is sufficiently tight that no caulk or sealant is required.

Figure 3:
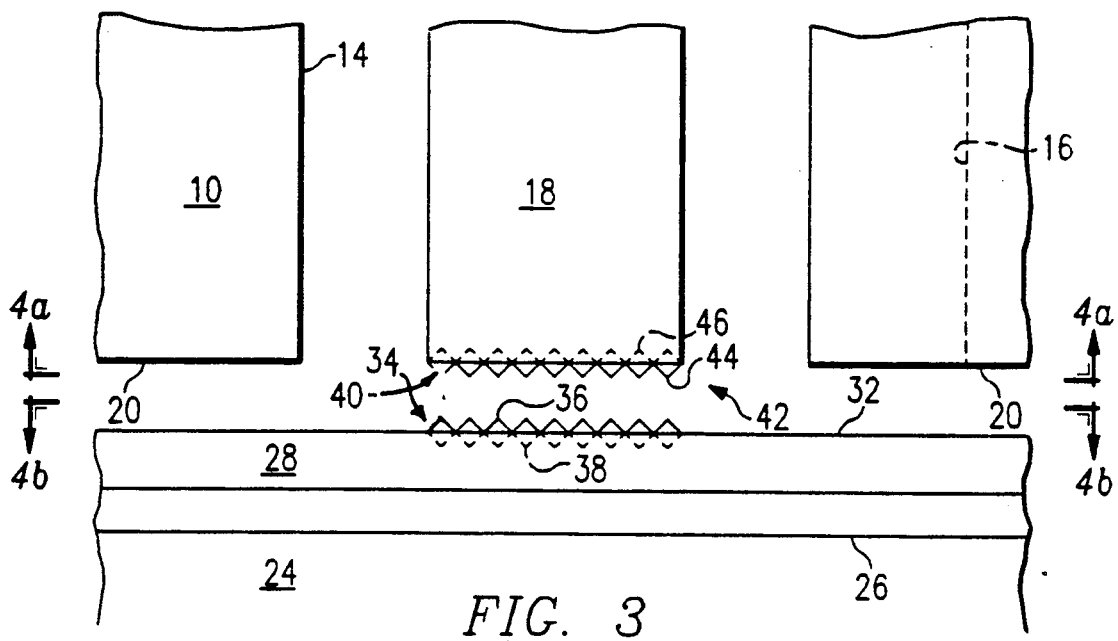
FIG. 3 is an enlarged fragmentary elevational view of a sealing structure according to the invention as used at the place of abutment of front cover and oil pan gaskets.

FIG. 3 is an enlarged exploded elevational view which shows gasket 28 having a major surface 32 with a contact area indicated generally at 34. Gasket 28 may be formed of any conventional elastomeric material which is oil-resistant and which withstands at least the moderately high temperatures found in vehicle engines, such as silicone rubber or polyacrylate. Contact area 34 includes a periodic array of peaks 36 and valleys 38 in two dimensions. The two dimensions are coplanar with the general surface 32 of gasket 28. The peaks 36 and valleys 38 are geometrical solids and voids, respectively, preferably having planar surfaces (described below), and preferably having no surfaces which are parallel to the plane of the general gasket surface 32.

The front cover gasket 18 includes an end surface 40 having a contact area 42 which includes a periodic array of peaks 44 and valleys 46 in two dimensions. The two dimensions are coplanar with the general plane of end surface 40. In a preferred embodiment, the contact area 42 is coextensive with the end surface 40, but in other embodiments, the contact area 42 may be only a portion of the end surface 40. The front cover gasket 18 may be formed of any conventional elastomeric material which is oil-resistant and which withstands at least the moderately high temperatures which are found in internal combustion engines Such materials include silicone rubber and polyacrylate.

The peaks 44 and valleys 46 are geometrical solids and voids, respectively, having planar surfaces, and having no surfaces which are parallel to the general plane of surface 32.

By "general plane" or by "generally formed with a plane", it is meant that when one disregards the irregularities caused by peaks 36 and valleys 38, the gasket major surface 32 can be said to lie within a plane. It is preferred that the pyramidal or other geometric faces forming the peaks and valleys 36 and 38 lie in planes which are not parallel with the plane in which the surface 32 generally lies Likewise, the end surface 40 of the front cover gasket 18 can be said to generally lie within a plane, when one ignores the irregularities caused by the peaks 44 and valleys 46. It is preferred that the faces of the peaks 44 and the valley 46 be formed at angles to the general plane formed by the end surface 40.

The array of peaks 44 and valleys 46 are arranged in a reciprocating fashion, allowing peaks 36 and valleys 38 to engagingly mate, respectively, with valleys 46 and peaks 44 to provide a relatively leak-proof seal when mated.

Figure 4A:
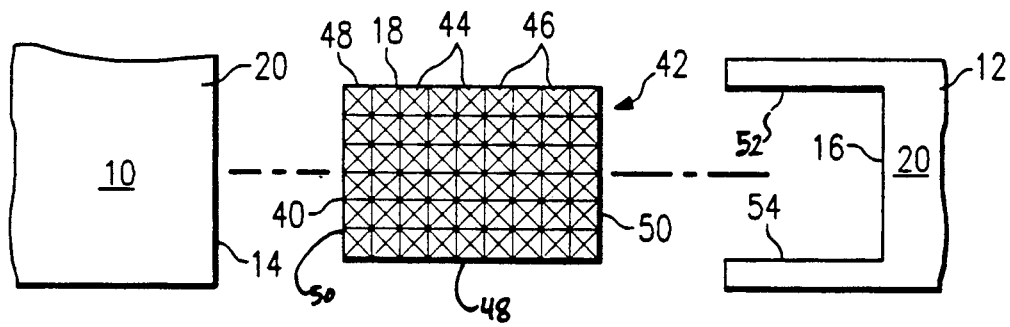
FIG. 4a is an exploded plan view of a portion of an engine block, front cover gasket and front cover taken substantially along line 4a–4a of FIG. 3.
Figure 4B:
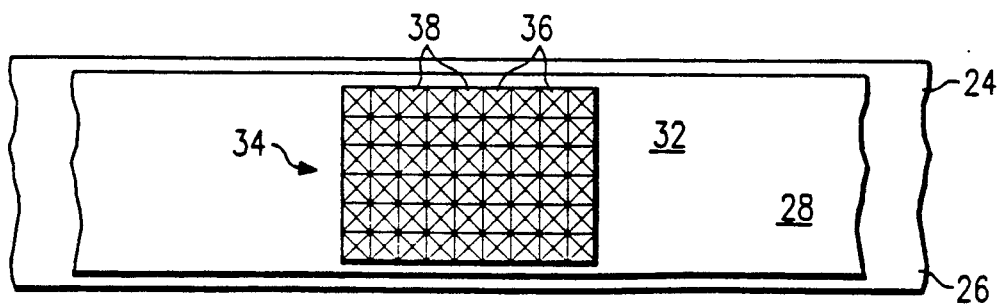
FIG. 4b is a partial plan view of an oil pan lip and gasket taken substantially along line 4b–4b of FIG. 3.

FIGS. 4a and 4b are upward-looking and downward-looking plan views taken substantially along lines 4a–4a and 4b–4b of FIG. 3, respectively FIG. 4 better shows the two-dimensional array of peaks 36 and valleys 38 in the contact surface 34. This two-dimensional array mates with the valleys 46 and peaks 44 of the end surface array 42. The gasket 18 has major surfaces 48 and major surfaces 50, both of which are substantially perpendicular to the end surface 40. Front cover 12 has a channel formed by walls 52 and 54 into which the gasket 18 is intended to be inserted. A surface 50 of gasket 18 mates with surface 16 of the front cover 12, while surfaces 48 of the gasket 18 partially mate with the walls 52 and 54 of the front cover 12. To aid the reader's appreciation of the geometrical shapes being used, rectilinear vertical and horizontal lines have been added to contact surfaces 34 and 42. This is to show that the peaks are four-sided pyramids, and the valleys are four-sided pyramidal voids In actuality, the grids of vertical and horizontal lines would not be apparent. This is because any face of a pyramidal peak is continuous and coplanar with the face of an adjacent pyramidal valley.

In an alternative embodiment (not shown), the contact area of the oil pan gasket could consist of a periodic array of valleys in two dimensions. The valleys would preferably be geometrical voids having planar surfaces formed at angles to the general plane of the gasket major surface, and no flat surfaces in parallel therewith. The contact area of the end surface of the front cover gasket would include a complementary periodic array of peaks in two dimensions The peaks would be geometrical solids having planar surfaces disposed at angles to the general plane of the end surface, and no flat surfaces in parallel therewith. Accordingly, the peaks of the front cover gasket and the valleys of the oil pan gasket would be aligned with one another such that the peaks are received within the valleys when the oil pan 22 is secured to the assembled engine block 10 and front cover 12. The arrays could also be reversed, such that the front cover gasket only had peaks and the oil plan gasket only had valleys. Other mating combinations of peaks and valleys may be thought of, such as a grouping of peaks on one contact surface, with the rest of the features being valleys thereon, and a corresponding grouping of valleys on the other contact surface, with the rest of the features being peaks thereon.

As the result of the cooperation between the first and second gaskets 18 and 28, an interlocking surface is created along the junction therebetween. This interlocking engagement provides a better seal between first and second gaskets 18 and 28 than would otherwise occur if the peaks and valleys, or geometrical solids and voids, incorporated flat surfaces. The lack of flat surfaces allows for slight misalignments to occur without losing the sealing benefit of having periodic features on the two contact surfaces. If there is a slight misalignment of the contact surfaces, for example, the peaks of one of the contact surfaces will have a tendency to slide off the peaks of the other contact surface and into an adjacent receiving valley. Also, for contact surfaces having a substantial plurality of periods in both x- and y-dimensions, a somewhat larger misalignment of the gasket contact surfaces 42 and 34 is not fatal to a relatively oil-tight seal. This is because peaks which were intended to be received within one series of valleys will instead be received into an adjacent series of valleys. The present invention thus allows for misalignment of gasket 18 with gasket 28 in both x- and y-dimensions without destroying the sealing properties of the junction. This is why pointed features such as pyramids are preferred over those which have flat surfaces, as a slightly misaligned peak will always have a tendency to slide toward the bottom of a valley. On the other hand, a flat surface would merely engage with another flat surface without any tendency to self-align or re-align.

Figure 5:
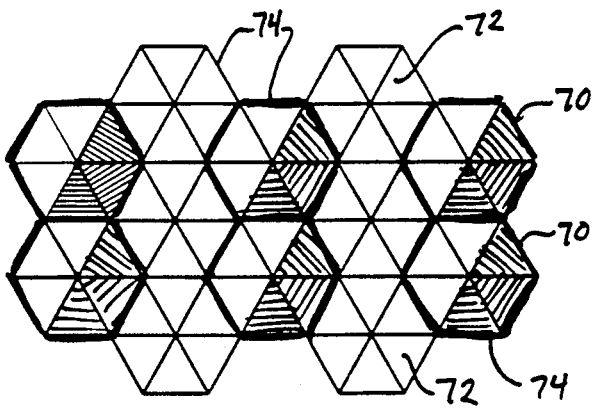
FIG. 5 is a detail showing the use of a hexagonal pyramidal array according to a first alternative embodiment of the invention.
Figure 6:
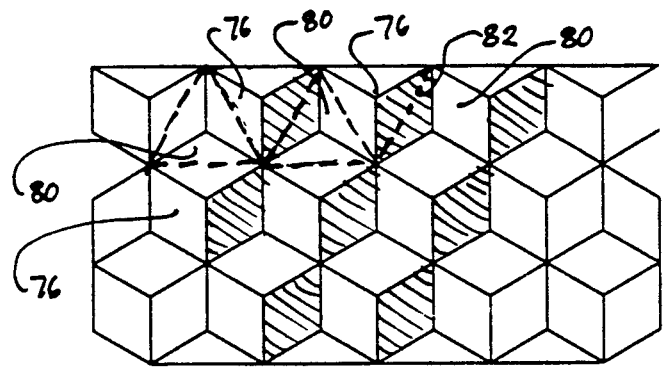
FIG. 6 is a detail of a triangular pyramidal array according to a second alternative embodiment of the invention.

The arrays shown in FIGS. 4a and 4b are based on pyramidal voids and pyramidal eminences having square bases or rims. It will be noted that each of the pyramidal peaks or valleys is contiguous on all of its borders with other peaks and valleys to the ends of the array in both the x and y directions (these directions being defined as the vertical and horizontal within the plane of the paper). FIGS. 5 and 6 illustrate contact surfaces that are based on different bases. FIG. 5, for example, shows a plurality of peaks 70 and valleys 72 which are formed on hexagonal bases 74. The bases 74 of the hexagonal peaks 70 have been darkened to aid in visual perception.

The array shown in FIG. 6 has pyramidal peaks 76 and pyramidal valleys 80 which are formed on triangular bases 82, shown in broken line. In each case, the geometrical base is preferably chosen such that it is contiguous with other geometrical bases of pyramids on all sides, and the feature is chosen such that the peaks have apices or ridges.

Other pyramidal geometric bases may be thought of, such as diamonds or convex-concave formations It is preferred that the periodic arrays formed according to the invention having bases which are contiguous with each other throughout the contact surface, and which form a point or ridge for each peak and a lowest depression or groove in each valley such that the contact surfaces will self-align or nest with each other.

Figure 7:
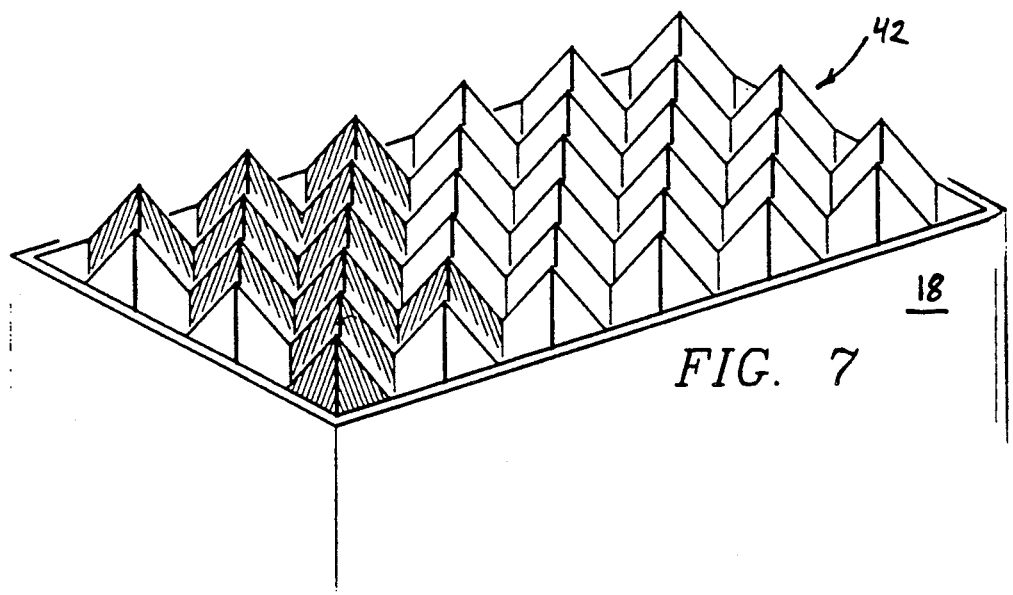
FIG. 7 is an isometric view of an edge surface of a front cover gasket according to the invention.

FIG. 7 is an isometric view of the a portion of front cover gasket 18. FIG. 7 better illustrates the three dimensional characteristic of the array of the geometric features, which extends in two directions that are contained within the general plane of the end surface 42 and have peaks 44 and valleys 46 which faces at an angle to the general plane. Therefore, this array of geometrical features allows for stack-up errors in each of the x, y and z directions. The distance from the highest point of the chosen geometrical solid to its base, or from the base of a geometrical void to its lowest point, should be chosen to be at least 100% of the vertical stack-up error expected for the assembly in which the gaskets are used. For the illustrated vehicle engine gasket, this vertical distance may range from 0.75 mm to 1.5 mm, and is preferably one mm. In the illustrated embodiment, the distance should be at least as high as the maximum cover offset relative to the oil pan, to cover any expected stack-up error.

The minimum number of periods required in the two-dimensional periodic arrays of the contact surfaces is two, with the preferred number of periods or repetitions being at least three. The maximum number of repetitions is limited by the thickness and breadth of the abutting gasket. It is important to remember that the pattern must be repeated in an x- and y-direction, thereby allowing shift along both the x-axis and y-axis to accommodate any misalignment problems.

Planar surfaces of the present invention provide an advantage over the prior art in that they facilitate interlock between surfaces 34 and 42. The flat surfaces of the prior art, when misaligned, did not provide the instability which would result in the shifting of the surfaces 34 and 42 to sufficiently align the gaskets, thereby providing a less than optimal seal. The planar surfaces of the present invention, when misaligned, are sufficiently unstable such that the gaskets may shift, if required, both in an x- and y-direction to get proper fit, resulting in a relatively leak-proof seal.

In summary, an invention has been provided with several advantages. The vehicle industry is continuously demanding more efficiency at economical cost. Using a sealing or caulking medium, such as RTV sealant, to provide a relatively leak-proof gasket assembly is costly, messy, difficult to service, is a cause of manufacturing error and adversely affects the rest of the seal. The use of the RTV-less gasket assembly of the present invention provides economical advantages both in labor and materials. Additionally, the two-dimensional periodic array of peaks and valleys included in the present invention allows for shift or misalignment along the x-axis, y-axis and z-axis to result in proper engagement under all expected stack-up conditions, a result that cannot be achieved with one-dimensional or linear key and hole arrangements which use flat surfaces.

The invention can be used wherever a relatively leak-proof seal is desired between gaskets, such as the connecting arrangement between a front cover and oil pan or front cover and rocker cover gasket. The two-dimensional periodic arrays of the contact surfaces described herein may also be used for composite gasket systems in which two gaskets are both interposed between the same assembly components that are to be mated to each other. That is, in addition to the use of the periodic arrays at "T" joints or junctions, the two-dimensional arrays may be employed between major, mating surfaces of gaskets where an intragasket seal is desired.

While preferred embodiments of the present invention and their advantages have been described with the aid of the above detailed description, the invention is not limited thereto, but only by the scope and spirit of the appended claims.

What is claimed is:

1. A gasket assembly, comprising:
   a first gasket having a first surface, a contact area of said first surface having a two-dimensional array of peaks and valleys, each peak in said array isolated from adjacent peaks in a first direction and in a second direction forming an angle with said first direction by valleys; and a second gasket having a second surface, a contact area of said second surface having a second two-dimensional array of peaks and valleys, each peak in said second array isolated from adjacent peaks in said second array in said first direction and in said second direction by valleys, said valleys of said first surface adapted to sealingly mate with said peaks of said second surface, said peaks of said first surface adapted to sealingly mate with said valleys of said second surface to provide a sealed junction between said first and second gaskets.

2. The assembly of claim 1, wherein said contact area of said second surface of said second gasket extends over substantially all of said second surface.

3. The assembly of claim 1, wherein at least one of said gaskets is formed from an elastomer.

4. The assembly of claim 3, wherein at least one of said gaskets is formed of silicone rubber.

5. The assembly of claim 3, wherein at least one of said gaskets is formed from polyacrylate.

6. The assembly of claim 1, wherein first direction is perpendicular to said second direction, said first and second directions parallel with a plane including the general plane of said first surface of said first gasket, each peak and valley having a plurality of planar faces formed at angles to said plane.

7. The assembly of claim 6, wherein said plurality of planar faces form a four-sided pyramidal shape.

8. The assembly of claim 6, wherein said plurality of planar faces form a hexagonal pyramidal shape.

9. The assembly of claim 6, wherein said plurality of planar faces form a triangular pyramidal shape.

10. The assembly of claim 1, wherein said first surface of said first gasket is generally coplanar with a plane, said peaks and valleys having substantially no surfaces parallel to said plane.

11. The assembly of claim 1, wherein said valleys include at least two valleys in each of said first and second directions.

12. The assembly of claim 11, wherein said array of valleys includes at least three valleys in at least one of said two dimensions.

13. The assembly of claim 1, wherein in said first surface comprises a major surface of said first gasket, said second surface of said second gasket comprising an end surface of said second gasket, said second gasket having at least one major surface, said end surface having an area substantially smaller than said major surface of said second gasket.

14. The gasket assembly of claim 1, wherein said first surface of said first gasket is formed along a plane, said contact areas having a plurality of geometric features including said peaks and valleys, each said contact area being substantially filled with said geometric features such that each said contact area contains substantially no face parallel to said plane.

15. The gasket assembly of claim 1, wherein said first and second gaskets are formed of elastomeric material.

16. A gasket assembly comprising:

a first gasket having a major surface, a contact area of said major surface including an array of geometrical peaks and valleys each having a plurality of planar faces, said peaks and valleys being periodic in a first direction and in a second direction at an angle to said first direction; and a second gasket having an end surface, a major surface and a thickness, said end surface having an area substantially smaller than said major surface of said second gasket, a contact area of said end surface including an array of geometrical peaks and valleys having planar faces which is periodic in said first and second directions, said second direction having a component parallel to said thickness, said peaks and valleys of said first gasket juxtaposed and adapted to sealingly mate with respective valleys and peaks of said second gasket to provide a sealed joint.

17. The gasket assembly of claim 16, wherein said second direction is perpendicular to said first direction.

18. The gasket assembly of claim 16, wherein said second direction is parallel to the thickness of said second gasket.

19. In a vehicle engine including first, second and third component having abutting end faces to be secured together, a sealing structure comprising:

a first gasket interposed between said first and second components, said first gasket including an end surface, a contact area of said end surface including an array of peaks and valleys which is periodic in a first direction and in a second direction at an angle to said first direction; and a second gasket having a major surface interposed between said third component and said first and second components, said major surface having an area substantially larger than said end surface, a contact area of said major surface including an array of peaks and valleys which is periodic in said first and second directions, said peaks and valleys of said second gasket being juxtaposed and adapted to sealingly and matingly engage with said valleys and peaks of said first gasket to provide a sealed joint.

20. The sealing structure of claim 19, wherein the assembly of said components is specified to be within a specified stack-up error in a direction perpendicular to said major surface of said first gasket, a height of said peaks chosen to be at least one hundred percent of said stack-up error.

21. The sealing structure of claim 19, wherein said first gasket has a thickness, said arrays of peaks and valleys being periodic in a direction perpendicular to said thickness.

22. A method of making a gasket assembly, the steps comprising:

providing at least two gasket sections, the first gasket section having a major surface, a contact area of said major surface having an array including peaks and valleys and a second gasket section having a major surface and an end surface, each peak in the array isolated from adjacent peaks in a first direction and in a second direction forming an angle to the first direction by valleys, said end surface of said second gasket section having an area substantially smaller than said major surface thereof, a contact area of said end surface having a second array including peaks and valleys, each peak in the second array isolated from adjacent peaks in the first direction and in the second direction by valleys;

joining a first component to a second component such that said major surface of the second gasket section is interposed between the first and second components;

joining a third component to the first and second components such that the major surface of said first gasket section is interposed between said third component and said first and second components; and responsive to said step of joining the third component to the first and second components, sealingly mating the peaks and valleys of the contact area of the first gasket section to the valleys and peaks of the contact area of the second gasket section to create a sealed joint.

23. The method in accordance with claim 22, wherein each gasket comprises elastomeric material.

* * * * *